(12) United States Patent
Cheng et al.

(10) Patent No.: US 9,483,401 B2
(45) Date of Patent: Nov. 1, 2016

(54) DATA PROCESSING METHOD AND APPARATUS

(71) Applicant: Huawei Technologies Co., Ltd., Shenzhen (CN)

(72) Inventors: Yongbo Cheng, Chengdu (CN); Tao Li, Hangzhou (CN); Chenghong He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 357 days.

(21) Appl. No.: 13/871,335

(22) Filed: Apr. 26, 2013

(65) Prior Publication Data

US 2013/0290634 A1    Oct. 31, 2013

(30) Foreign Application Priority Data

Apr. 28, 2012  (CN) .......................... 2012 1 0133067

(51) Int. Cl.
| | | |
|---|---|---|
| *G06F 12/00* | (2006.01) | |
| *G06F 12/08* | (2016.01) | |
| *G06F 7/06* | (2006.01) | |
| *G06F 3/06* | (2006.01) | |

(52) U.S. Cl.
CPC ......... *G06F 12/0802* (2013.01); *G06F 3/0662* (2013.01); *G06F 7/06* (2013.01)

(58) Field of Classification Search
USPC ........................................................ 711/118
See application file for complete search history.

(56) References Cited

U.S. PATENT DOCUMENTS

| | | | | |
|---|---|---|---|---|
| 6,473,837 | B1 * | 10/2002 | Hughes et al. ............... | 711/146 |
| 2005/0193171 | A1 | 9/2005 | Bacchus | |
| 2008/0082806 | A1 | 4/2008 | Yoshida | |
| 2008/0104329 | A1 | 5/2008 | Gaither et al. | |
| 2012/0198161 | A1 * | 8/2012 | Chachad et al. .............. | 711/122 |

FOREIGN PATENT DOCUMENTS

| | | |
|---|---|---|
| CN | 101354641 A | 1/2009 |
| CN | 101887398 A | 11/2010 |

OTHER PUBLICATIONS

Foreign Communication From a Counterpart Application, Chinese Application No. 201210133067.3, Chinese Office Action dated Apr. 14, 2014, 6 pages.
Partial English Translation and Abstract of Chinese Patent Application No. CN101354641A, May 27, 2014, 5 pages.

* cited by examiner

*Primary Examiner* — Jared Rutz
*Assistant Examiner* — Hamdy S Ahmed
(74) *Attorney, Agent, or Firm* — Conley Rose, P.C.; Grant Rodolph; Nicholas K. Beaulieu

(57) ABSTRACT

Embodiments of the present invention disclose a data processing method and apparatus. The method includes: first receiving an operation command, then searching, according to a memory address, a Cache memory in a Cache controller for data to be operated, and storing the operation command in a missed command buffer area in the Cache controller when the data to be operated is not found through searching in the Cache memory; then, storing data sent by an external memory in a data buffer area of the Cache controller after sending a read command to the external memory, and finally processing, according to a missed command, the data acquired from the external memory and the data carried in the missed command. The present invention applies to the field of computer systems.

13 Claims, 4 Drawing Sheets

DATA PROCESSING METHOD AND APPARATUS

CROSS-REFERENCE TO RELATED APPLICATION

This application claims priority to Chinese Patent Application No. 201210133067.3, filed on Apr. 28, 2012, which is hereby incorporated by reference in its entirety.

TECHNICAL FIELD

The present invention relates to the field of computer systems, and in particular to a data processing method and apparatus.

BACKGROUND

A Cache is the most basic and important component in a modern computer memory system. A main function of the Cache is to moderate a difference of performance between a high-speed processor and a low-speed external memory, thereby preventing performance of the processor from being affected because of waiting for memory data.

For reading, writing, or storing in a Cache, there are two cases: hit and miss. If data that needs to be read and written exists in the Cache, it indicates hit, and in this case, speed of reading and writing in the Cache is relatively high; otherwise, it indicates miss, and in this case, a corresponding data block needs to be loaded from an external memory.

A basic design idea for a modern Cache controller is as follows: An upper-layer command interface issues a read/write command, and the Cache controller first checks whether data corresponding to an address of the command is buffered in a Cache memory. If a hit occurs, an read/write operation is completed directly in the Cache memory; if a miss occurs, the command needs to be blocked temporarily, a read command needs to be initiated to an external memory, then data read from the external memory needs to be written into the Cache memory, and the previously blocked upper-layer command needs to be invoked again, thereby completing read/write of the data.

However, if this technology is adopted, in a case that an operation command misses a Cache memory in a Cache controller, the number of times of arbitration applications and the number of times of read and write are relatively high for the Cache memory, which causes a problem that a delay in an operation on the Cache memory and a bandwidth occupied by the operation are relatively high.

SUMMARY

Embodiments of the present invention provide a data processing method and apparatus, which reduce a delay in an operation on a Cache memory and a bandwidth of the operation in a case that an operation command misses the Cache memory in a Cache controller.

Technical solutions adopted in the embodiments of the present invention are as follows:

A data processing method includes:
receiving an operation command, where the operation command includes a memory address of data to be operated;
searching, according to the memory address, a Cache memory in a Cache controller for the data to be operated, and storing the operation command in a missed command buffer area which is used to store missed commands and is in the Cache controller when the data to be operated is not found through searching in the Cache memory;
storing data sent by an external memory in a data buffer area of the Cache controller after sending a read command to the external memory, where the data corresponds to the operation command; and
processing, according to the operation command that is stored in the missed command buffer area and corresponds to the data, the data sent by the external memory.

A data processing apparatus includes:
a receiving unit, configured to receive an operation command, where the operation command includes a memory address of data to be operated;
a searching unit, configured to search for, according to the memory address, the data to be operated, and store the operation command when the data to be operated is not found through searching;
a storage unit, configured to store data sent by an external memory after sending a read command to the external memory, where the data corresponds to the operation command; and
a processing unit, configured to process, according to the operation command that is stored in the storage unit and corresponds to the data, the data sent by the external memory.

According to the data processing method and apparatus provided in the embodiments of the present invention, first an operation command is received, and then a Cache memory in a Cache controller is searched, according to a memory address, for data to be operated; when the data to be operated is not found through searching in the Cache memory, the operation command is stored in a missed command buffer area in the Cache controller; then, after a read command is sent to an external memory, data sent by the external memory is stored in a data buffer area of the Cache controller, and finally, the data acquired from the external memory and the data carried in a missed command are processed according to the missed command. In the prior art, when a case that an operation command misses a Cache memory in a Cache controller is handled, the number of times of arbitration applications and the number of times of read and write are relatively high for the Cache memory, which causes that a delay in an operation on the Cache memory and a bandwidth of the operation are relatively high. In the embodiments of the present invention, when a case that an operation command misses a Cache memory is handled, data that needs to be written is merged, or data that needs to be read is directly output, thereby reducing a delay in an operation on the Cache memory and a bandwidth occupied by the operation and improving work performance of the Cache memory.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description are merely some embodiments of the present invention, and persons of ordinary skill in the art may further obtain other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely part rather than all of the embodiments of the present invention. All other embodiments obtained by persons of ordinary skill in the art based on the embodiments of the present invention without creative efforts shall fall within the protection scope of the present invention.

To make the advantages of the technical solutions of the present invention more comprehensible, the following describes the present invention in detail with reference to the accompanying drawings and the embodiments.

Embodiment 1

Figure 1:
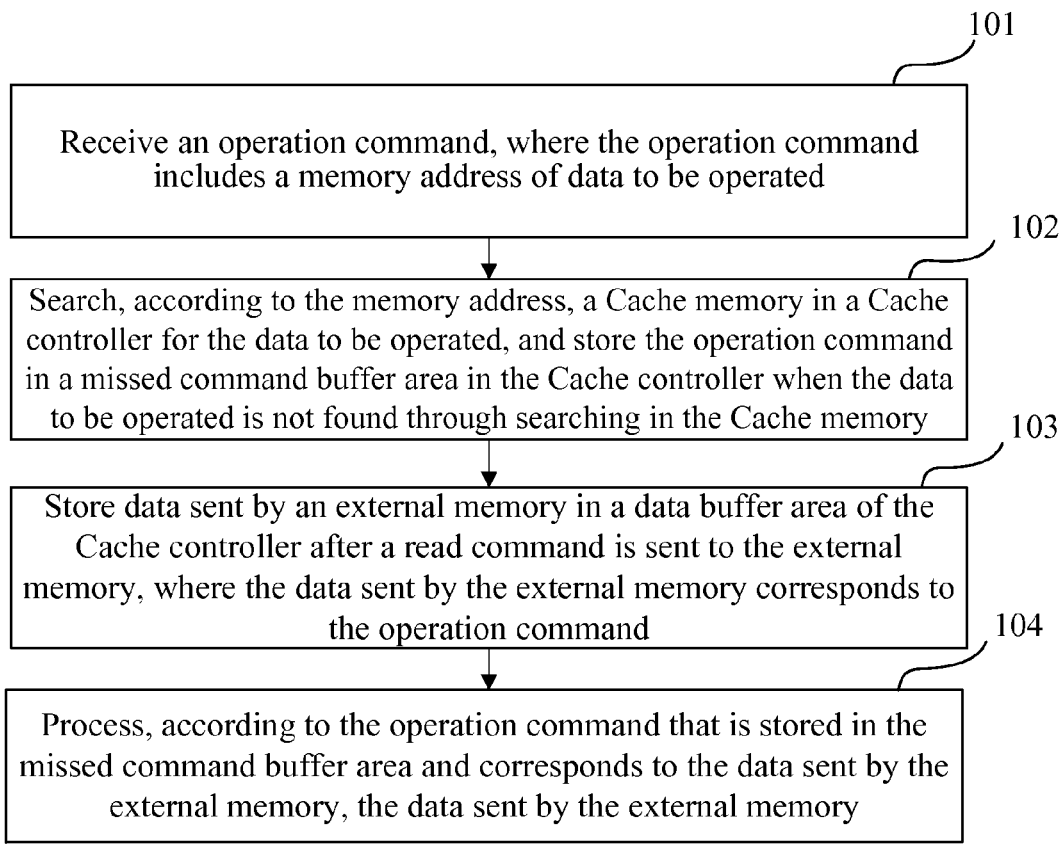
FIG. 1 is a flowchart of a data processing method according to Embodiment 1 of the present invention.

This embodiment provides a data processing method. As shown in FIG. 1, the method includes:

Step 101: Receive an operation command, where the operation command includes a memory address of data to be operated.

The operation command may be a read operation command, and may also be a write operation command.

Step 102: Search, according to the memory address, a Cache memory in a Cache controller for the data to be operated, and store the operation command in a missed command buffer area in the Cache controller when the data to be operated is not found through searching in the Cache memory.

Alternatively, when an upper-layer operation command hits the Cache controller, that is, when the data required by the command is stored in the Cache controller, a read/write operation is directly performed on the Cache controller.

Step 103: Store data sent by an external memory in a data buffer area of the Cache controller after a read command is sent to the external memory, where the data sent by the external memory corresponds to the operation command.

Step 104: Process, according to the operation command that is stored in the missed command buffer area and corresponds to the data sent by the external memory, the data sent by the external memory.

Figure 2:
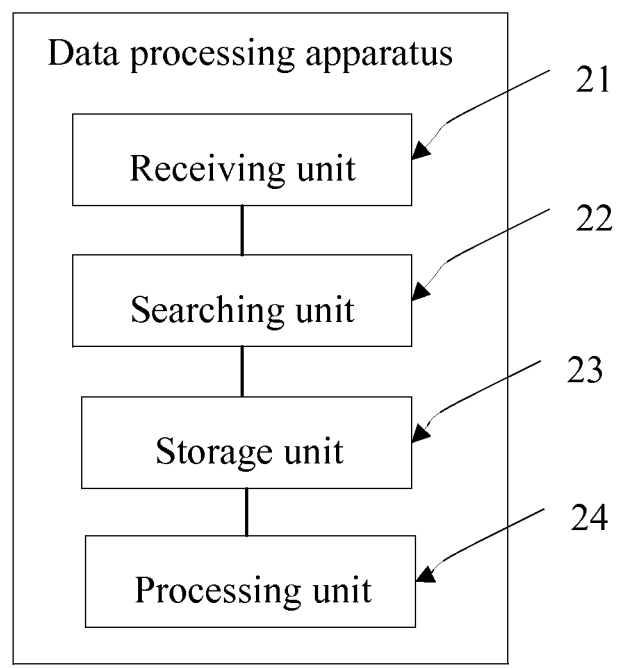
FIG. 2 is a schematic structural diagram of a data processing apparatus according to Embodiment 1 of the present invention.

This embodiment provides a data processing apparatus. As shown in FIG. 2, an entity of the apparatus may be a Cache controller. The apparatus includes a receiving unit 21, a searching unit 22, a storage unit 23, and a processing unit 24.

The receiving unit 21 is configured to receive an operation command, where the operation command includes a memory address of data to be operated.

The searching unit 22 is configured to search for, according to the memory address received by the receiving unit 21, the data to be operated, and store the operation command when the data to be operated is not found through searching.

The storage unit 23 is configured to store data sent by an external memory after sending a read command to the external memory, where the data corresponds to the operation command.

The processing unit 24 is configured to process, according to the operation command that is stored in the storage unit 23 and corresponds to the data sent by the external memory, the data sent by the external memory.

According to the data processing method and apparatus provided in this embodiment of the present invention, first an operation command is received, and then a Cache memory in a Cache controller is searched, according to a memory address, for data to be operated; when the data to be operated is not found through searching in the Cache memory, the operation command is stored in a missed command buffer area in the Cache controller; then, after a read command is sent to an external memory, data sent by the external memory is stored in a data buffer area of the Cache controller, and finally, the data acquired from the external memory and the data carried in a missed command are processed according to the missed command. In the prior art, when a case that an operation command misses a Cache memory in a Cache controller is handled, the number of times of arbitration applications and the number of times of read and write are relatively high for the Cache memory, which causes that a delay in an operation on the Cache memory and a bandwidth of the operation are relatively high. In this embodiment of the present invention, when a case that an operation command misses a Cache memory is handled, data that needs to be written is merged, or data that needs to be read is directly output, thereby reducing a delay in an operation on the Cache memory and a bandwidth occupied by the operation and improving work performance of the Cache memory.

Embodiment 2

Figure 3:
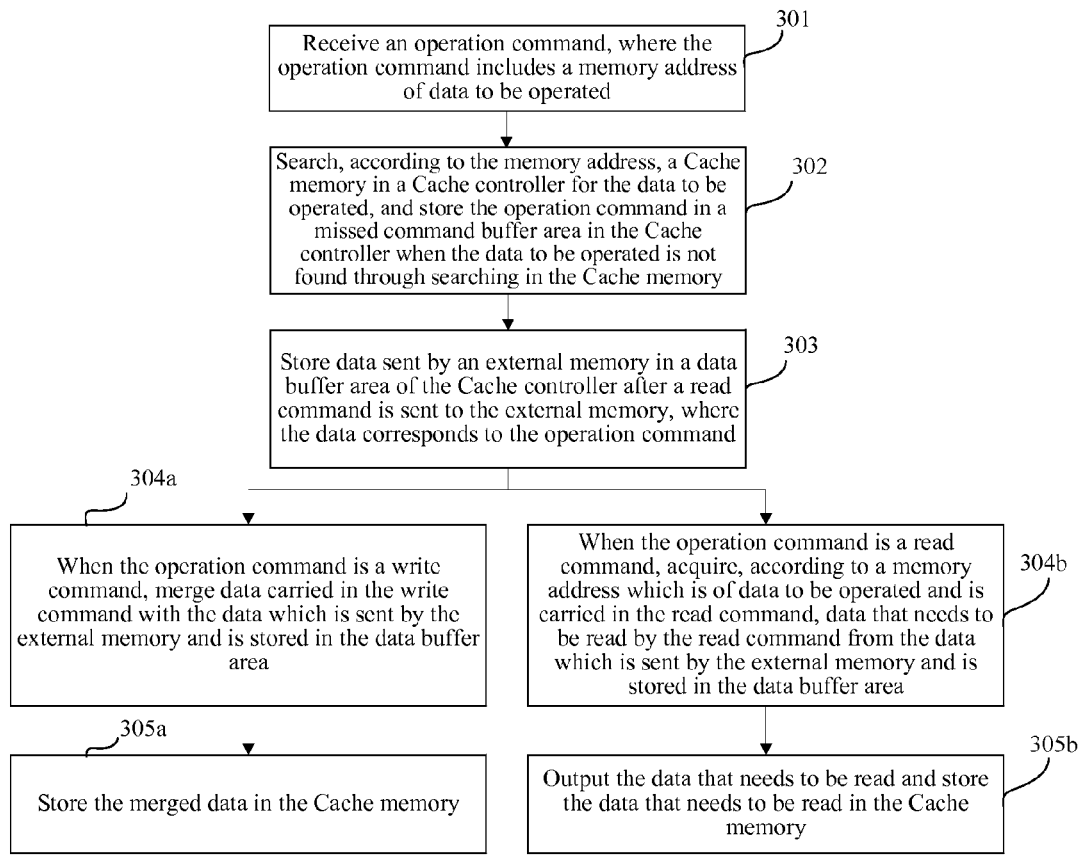
FIG. 3 is a flowchart of a data processing method according to Embodiment 2 of the present invention.

This embodiment provides a data processing method. As shown in FIG. 3, the method includes:

Step 301: Receive an operation command, where the operation command includes a memory address of data to be operated.

Step 302: Search, according to the memory address, a Cache memory in a Cache controller for the data to be operated, and store the operation command in a missed command buffer area in the Cache controller when the data to be operated is not found through searching in the Cache memory.

Alternatively, when an upper-layer operation command hits the Cache controller, that is, when the data required by the command is stored in the Cache controller, a read/write operation is directly performed on the Cache controller.

Step 303: Store data sent by an external memory in a data buffer area of the Cache controller after a read command is sent to the external memory, where the data corresponds to the operation command.

Step 304a: When the operation command is a write command, merge data carried in the write command with the data which is sent by the external memory and is stored in the data buffer area.

Step 305a: Store the merged data in the Cache memory.

In the prior art, when the operation command is the write command, write data carried in the write command and the data read from the external memory are written into the Cache separately, and therefore, two write operations need to be performed. An improvement of the present invention lies in that the write data carried in the write command and the data read from the external memory are first merged and then stored before a write operation is performed, and therefore, the number of times of write in the Cache memory is reduced.

Step 304b: When the operation command is a read command, acquire, according to a memory address which is of data to be operated and is carried in the read command, data that needs to be read by the read command from the data which is sent by the external memory and is stored in the data buffer area.

Step 305b: Output the data that needs to be read and store the data that needs to be read in the Cache memory.

In an existing solution, if a read/write command misses a Cache memory in a Cache controller, ports of an input command buffer area, a data buffer area, and a missed command buffer area of the Cache controller need to initiate a command request to the Cache memory in turn. In this embodiment of the present invention, if a read/write command misses a Cache memory in a Cache controller, only ports of an input command buffer area and a data buffer area of the Cache controller need to initiate a command request to the Cache memory, thereby reducing a bandwidth occupied by the Cache memory. For a miss read command, read data is directly output after being obtained from the data buffer area, thereby further reducing a delay required by the read command.

Figure 4:
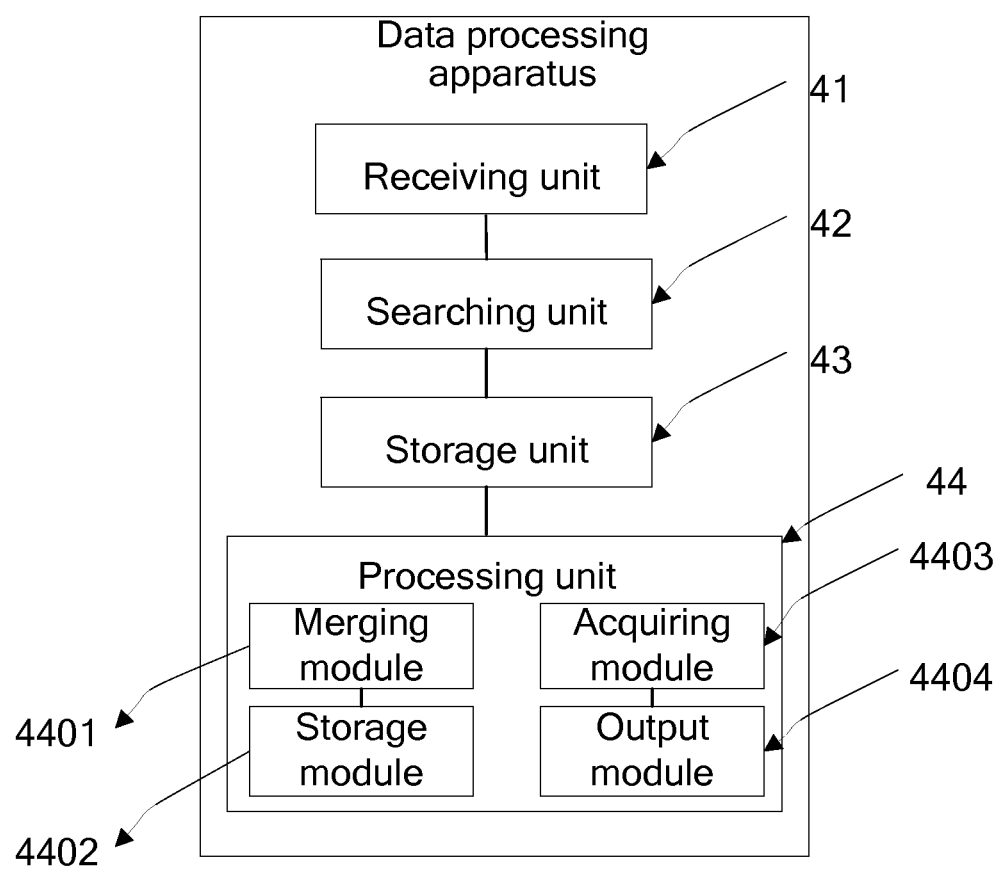
FIG. 4 is a schematic structural diagram of a data processing apparatus according to Embodiment 2 of the present invention.

This embodiment provides a data processing apparatus. As shown in FIG. 4, an entity of the apparatus may be a Cache controller. The apparatus includes a receiving unit 41, a searching unit 42, a storage unit 43, and a processing unit 44.

The receiving unit 41 is configured to receive an operation command, where the operation command includes a memory address of data to be operated.

The searching unit 42 is configured to search for, according to the memory address received by the receiving unit 41, the data to be operated, and store the operation command when the data to be operated is not found through searching.

The storage unit 43 is configured to store data sent by an external memory after sending a read command to the external memory, where the data corresponds to the operation command.

The processing unit 44 is configured to process, according to the operation command that is stored in the storage unit 43 and corresponds to the data sent by the external memory, the data sent by the external memory.

The processing unit 44 may include a merging module 4401 and a storage module 4402.

The merging module 4401 is configured to, when the operation command is a write command, merge data carried in the write command with the data which is sent by the external memory and is stored in the storage unit.

The storage module 4402 is configured to store the data merged by the merging module 4401.

The processing unit 44 may further include an acquiring module 4403 and an output module 4404.

The acquiring module 4403 is configured to, when the operation command is a read command, acquire, according to a memory address which is of data to be operated and is carried in the read command, data that needs to be read by the read command from the data sent by the external memory.

The output module 4404 is configured to output the data that needs to be read, and store the data that needs to be read.

According to the data processing method and apparatus provided in this embodiment of the present invention, first an operation command is received, and then a Cache memory in a Cache controller is searched, according to a memory address, for data to be operated; when the data to be operated is not found through searching in the Cache memory, the operation command is stored in a missed command buffer area in the Cache controller; then, after a read command is sent to an external memory, data sent by the external memory is stored in a data buffer area of the Cache controller, and finally, the data acquired from the external memory and the data carried in a missed command are processed according to the missed command. In the prior art, when a case that an operation command misses a Cache memory in a Cache controller is handled, the number of times of arbitration applications and the number of times of read and write are relatively high for the Cache memory, which causes that a delay in an operation on the Cache memory and a bandwidth of the operation are relatively high. In this embodiment of the present invention, when a case that an operation command misses a Cache memory is handled, data that needs to be written is merged, or data that needs to be read is directly output, thereby reducing a delay in an operation on the Cache memory and a bandwidth occupied by the operation and improving work performance of the Cache memory.

The data processing apparatus provided in the embodiments of the present invention is capable of implementing the method embodiments provided in the foregoing. For specific function implementation, reference may be made to the description in the method embodiments, and details are not repeatedly described here. The data processing method and apparatus provided in the embodiments of the present invention may apply to the field of computer systems, but are not limited to this field.

Persons of ordinary skill in the art may understand that all or part of the processes of the methods in the foregoing embodiments may be implemented by a computer program instructing relevant hardware. The program may be stored in a computer readable storage medium. When the program is run, the processes of the methods in the foregoing embodiments are performed. The storage medium may be a magnetic disk, an optical disk, a read-only memory (ROM), or a random access memory (RAM), or the like.

The foregoing description is merely specific embodiments of the present invention, but is not intended to limit the protection scope of the present invention. Any variation or replacement readily figured out by persons skilled in the art within the technical scope of the present invention shall fall within the protection scope of the present invention. Therefore, the protection scope of the present invention shall be subject to the protection scope of the claims.

What is claimed is:

1. A data processing method, comprising:
   receiving an operation command, wherein the operation command comprises a memory address of data to be operated;
   searching, according to the memory address, a cache memory in a cache controller for the data to be operated;
   storing the operation command in a missed command buffer area in the cache controller when the data to be operated is not found through searching in the cache memory;
   storing data sent by an external memory in a data buffer area of the cache controller after sending a read command to the external memory, wherein the data sent by the external memory corresponds to the operation and; and
   processing, according to the operation command that is stored in the missed command buffer area and corresponds to the data sent by the external memory, the data sent by the external memory, wherein processing the data sent by the external memory comprises directly outputting the data sent by the external memory from the data buffer area when the operation command comprises a read command, wherein processing the data sent by the external memory comprises merging data in a write command with the data sent by the external memory to form merged data when the operation command is the write command, command, wherein neither the data in the write command nor the data sent by the external memory are written to memory before the data in the write command and the data sent by the external memory are merged, and wherein the merged data is written to the memory at a same time such that the data in the write command and the data sent by the external memory are not separately written to the memory.

2. The data processing method according to claim 1, wherein processing the data sent by the external memory comprises storing the merged data in the cache memory when the operation command is the write command.

3. The data processing method according to claim 2, wherein processing the data sent by the external memory comprises:
when the operation command is the read command, acquiring, according to the memory address which is of the data to be operated and is carried in the read command, data that needs to be read by the read command from the data which is sent by the external memory and is stored in the data buffer area; and
storing the data that needs to be read in the cache memory.

4. The data processing method according to claim 3, wherein ports initiate the operation command when the data to be operated is not found through searching in the cache memory.

5. The data processing method according to claim 4, wherein the memory controller comprises a port of an input command buffer area, a port of a data buffer area, and a port of a missed command buffer area, and wherein the ports that initiate the operation command consist of the port of the input command buffer area and the port of the data buffer area.

6. A data processing apparatus, comprising:
a cache controller configured to:
receive an operation command, wherein the operation command comprises a memory address of data to be operated;
search for, according to the memory address, the data to be operated; and
store the operation command when the data to be operated is not found through searching; and
a cache memory configured to store data sent by an external memory after sending a read command to the external memory, wherein the data corresponds to the operation command,
wherein the cache controller is configured to process, according to the operation command that is stored in the cache memory and corresponds to the data sent by the external memory, the data sent by the external memory,
wherein the cache controller is configured to process the data sent by the external memory comprises the cache controller directly outputting the data sent by the external memory from a data buffer area of the cache controller when the operation command comprises the read command, wherein the cache controller is configured to process the data sent by the external memory comprises the cache controller merging data in a write command with the data sent by the external memory to form merged data when the operation command is the write command, wherein neither the data in the write command nor the data sent by the external memory are written to memory before the data in the write command and the data sent by the external memory are merged, and wherein the merged data is written to the memory at a same time such that the data in the write command and the data sent by the external memory are not separately wtitten to the memory.

7. The data processing apparatus according to claim 6, wherein the cache controller is configured to store the merged data in the cache memory when the operation command is the write command.

8. The data processing apparatus according to claim 7, wherein the cache controller is configured to:
when the operation command is the read command, acquire, according to the memory address which is of the data to be operated and is carried in the read command, data that needs to be read by the read command from the data sent by the external memory; and
store the data that needs to be read.

9. The data processing apparatus according to claim 8, wherein ports initiate the operation command when the data to be operated is not found through searching in the cache memory.

10. The data processing apparatus according to claim 9, wherein the memory controller comprises a port of an input command buffer area, a port of a data buffer area, and a port of a missed command buffer area, and wherein the ports that initiate the operation command consist of the port of the input command buffer area and the port of the data buffer area.

11. A data processing method, comprising:
receiving a first operation command, wherein the first operation command comprises a write command and a first memory address of first data to be operated;
searching, according to the first memory address, a cache memory in a cache controller for the first data to be operated, and storing the first operation command in a missed command buffer area in the cache controller when the first data to be operated is not found through searching in the cache memory;
storing first data sent by an external memory in a data buffer area of the cache controller after sending a first read command to the external memory, wherein the first data sent by the external memory corresponds to the first operation command;
merging data carried in the write command with the first data which is sent by the external memory and is stored in the data buffer area to form merged data;
storing the merged data in the cache memory;
receiving a second operation command, wherein the second operation command comprises a second read command and a second memory address of second data to be operated;
searching, according to the second memory address, the cache memory in the cache controller for the second data to be operated, and storing the second operation command in the missed command buffer area in the cache controller when the second data to be operated is not found through searching in the cache memory;

storing second data sent by the external memory in the data buffer area of the cache controller after sending the second read command to the external memory, wherein the second data sent by the external memory corresponds to the second operation command;

acquiring, according to the second memory address which is of the second data to be operated and is carried in the second read command, data that needs to be read by the second read command from the second data which is sent by the external memory and is stored in the data buffer area;

directly outputting the second data that needs to be read from the data buffer area; and storing the second data that needs to be read in the cache memory, wherein neither the data in the write command nor the data sent by the external memory are written to memory before the data in the write command and the data sent by the external memory are merged, and wherein the merged data is written to the memory at a same time such that the data in the command and the data sent by the external memory are not separately written to the memory.

12. The data processing method according to claim 11, wherein ports initiate the second operation command when the data to be operated is not found through searching in the cache memory.

13. The data processing method according to claim 12, wherein the memory controller comprises a port of an input command buffer area, a port of a data buffer area, and a port of a missed command buffer area, and wherein the ports that initiate the second operation command consist of the port of the input command buffer area and the port of the data buffer area.

* * * * *